United States Patent [19]

Goins

[11] 4,184,035

[45] Jan. 15, 1980

[54] PROCESS FOR NEUTRALIZING HALOGENATED ACID INTERMEDIATES FOR POLYESTER PRODUCTION

[75] Inventor: Otto K. Goins, Breckenridge, Mich.

[73] Assignee: Velsicol Chemical Corporation, Chicago, Ill.

[21] Appl. No.: 504,211

[22] Filed: Sep. 9, 1974

[51] Int. Cl.$^2$ ............................................. C08G 63/18
[52] U.S. Cl. .................................... 528/274; 528/299; 560/90
[58] Field of Search .............. 260/75 M, 75 H, 475 P; 528/274, 299; 560/90

[56] References Cited

U.S. PATENT DOCUMENTS

| | | | |
|---|---|---|---|
| 3,641,111 | 2/1972 | Lazarus | 260/75 M X |
| 3,715,383 | 2/1973 | Praetzel et al. | 260/75 H X |
| 3,742,024 | 6/1973 | Ukai et al. | 260/75 M X |

OTHER PUBLICATIONS

Kunin, Robert and Myers, Robert J., Ion Exchange Resins, (John Wiley & Sons, Inc., N.Y., N.Y.) 1950, pp. 57-60.
Ion Exchange Resins, 4th Ed. (The British Drug Houses Ltd., B.D.H. Laboratory Chemicals Div., Poole, England), 1959, pp. 1-4 and 7.

*Primary Examiner*—Lucille M. Phynes
*Attorney, Agent, or Firm*—Dietmar Olesch; R. J. Schwarz

[57] ABSTRACT

Disclosed is a process for neutralizing an inorganic acid in the presence of a halogenated aliphatic polybasic acid or anhydride. The neutralization is carried out by adding to said acid or anhydride a primary or secondary amine containing at least two active hydrogen atoms per molecule as determined by the Zerewittenoff Method, and neutralizing the inorganic acid in the presence of the polybasic acid or anhydride. In one embodiment, the halogenated aliphatic or alicyclic polybasic acid or anhydride is present in a mixture wth a halogenated aromatic polybasic acid or anhydride and with a polyol and the neutralization is carried out before substantial polymerization occurs between the acids and polyol.

10 Claims, No Drawings

PROCESS FOR NEUTRALIZING HALOGENATED ACID INTERMEDIATES FOR POLYESTER PRODUCTION

BACKGROUND OF THE INVENTION

The present invention relates to polyester polymerization. More specifically, the invention relates to a process for preparing flame-retardant polyesters from halogenated polymerization reactants.

Polyesters can be flame-retarded by either of two basic approaches. One approach has been to distribute throughout the polymer a flame-retardant which does not enter into a polymerization reaction with the polyester intermediates or the polymerized polymer. A second approach has been to incorporate into the polyester polymer molecule the flame-retardant as an integral constituent of the molecule. As an example, phthalic anhydride is a common polyester acid intermediate which, when copolymerized with a polyol such as ethylene glycol, forms a polyester. By substituting a halogenated polybasic acid anhydride for the unsubstituted phthalic anhydride, the flame-retarding halogen atoms can be incorporated into the polymer molecule and hence become less subject to exudation and migration than are many flame-retardants which are only physically incorporated into the polymerized product. Tetrabromophthalic anhydride is an example of one halogenated aromatic polybasic acid intermediate which has been frequently used in the production of flame-retardant polyesters. Tetrachlorophthalic anhydride is another example. 1,4,5,6,7,7-hexachlorobicyclo[2,2,1]-5-heptene-2,3-dicarboxylic acid, commonly referred to as HET acid, is a halogenated aliphatic acid intermediate which is also used in flame-retardant polyester synthesis. In addition to the use of either an aromatic or an aliphatic acid intermediate in polyester synthesis, a mixture of two or more halogenated aromatic and aliphatic intermediates is often used advantageously to produce flame-retardant polyesters having some desirable combination of cost and flame-retardancy which cannot be attained through the use of either of the halogenated intermediates alone.

When halogenated polybasic acids or anhydrides are used in the synthesis of polyesters, it has often been necessary to neutralize inorganic acid residues, such as sulfuric acid or sulfur trioxide residues in the polybasic acids, before the polymerization reaction with the polyol is permitted to proceed. Tetrahalophthalic acids and anhydrides sometimes contain inorganic acidic residues which should be removed or inactivated before the acids or anhydrides are polymerized with polyol intermediates. The neutralization has customarily been conducted with a base sufficiently strong to neutralize the residual inorganic acid. Alkali metal salts of alkanoic acids such as sodium acetate have been effective in such applications as have certain organic bases such as amines and the like. When one or more halogenated aromatic polybasic acids or anhydrides are to be neutralized prior to their polymerization, a large number of bases have customarily been used to neutralize undesirable acid residues without materially affecting the halogenated aromatic polybasic acid's or anhydride's ability to enter into a subsequent polyester polymerization. One significant measure of the effect of the neutralizing base upon the acid or anhydride, in addition to the type of polymerized product formed, is a measurement of the color of the neutralized polymerization system after polymerization. A light color, similar to the color of the polymerization reactants before neutralization, is indicative of a neutralization which has caused little decompositional change in the polymerization reactants. A dark color, however, indicates that the neutralizing agent has reacted in such a way with the acid or diol intermediate as to produce decomposition products which may affect such properties of the polyester resin as impact strength, tensile strength and the like. Apart from any effect of the decomposition products upon strength properties, the dark color of the polymerization system, which is imparted to the polymeric product, is itself an undesirable property.

Many of the customary neutralizing agents used very effectively with halogenated aromatic acids alone are unsatisfactory when used with a mixture of halogenated aromatic and aliphatic acids because of the dark color produced in the polymerization system. Since, as pointed out above, mixtures of halogenated aromatic and aliphatic acids are desirable for certain applications, a means for neutralizing such mixtures without producing a discolored polymerization system and the consequent discolored polymerization product would constitute a valuable addition to the art. Providing such a means is one of the principal objects of this invention. Additional objects will become apparent from the detailed description of the invention which follows.

SUMMARY OF THE INVENTION

The present invention relates to a process for neutralizing an inorganic acid in the presence of a halogenated polybasic aliphatic or alicyclic acid or anhydride comprising neutralizing said inorganic acid with a primary or secondary amine containing at least two active hydrogen atoms per molecule as determined by the Zerewittenoff Method.

DESCRIPTION OF THE PREFERRED EMBODIMENTS

In the manufacture of some monomeric polybasic acids and anhydrides used in polyester synthesis, inorganic acidic residues from the manufacturing process are retained in the monomers. The acid residues if present have a deleterious effect upon the polyester polymerization and are therefore neutralized prior to initiating the polymerization reaction. Other undesirable side-effects due to the presence of inorganic acid include corrosion of materials of reactor construction and loss of glycol reactant because of its reaction with itself instead of the polybasic polyester intermediate. One inorganic acid residue commonly found in halogenated phthalic acids and anhydrides is sulfuric acid and its anhydride, sulfur trioxide. Other inorganic acids can also be present as impurities or as undesired components in the polybasic acid intermediates. It should be understood that the term "inorganic acid" includes both the acid and its anhydride, if such exists.

The acid residues or components accompanying a mixture of aromatic and aliphatic polybasic acid intermediates are neutralized with a primary or secondary amine containing at least two active hydrogen atoms per molecule as determined by the Zerewittenoff Method. The Zerewittenoff Method comprises a method for determining the active hydrogen content of organic compounds by reacting the organic compound with a methyl magnesium halide to give methane which can be volumetrically measured. In such a method, the hydrogen atoms attached to carbon atoms in an amine are not sufficiently active to react with the Grignard reagent whereas hydrogen atoms attached directly to the nitrogen atom, or hydrogen atoms attached to some intermediate atom such as oxygen or sulfur, are sufficiently reactable with the Grignard reagent to be removed by reaction with it. Those hydrogen atoms which react with the methyl magnesium halide to form methane are considered active hydrogen atoms as determined by the Zerewittenoff Method.

Excluded from the scope of the present invention are tertiary amines, even though they may contain the two active hydrogen atoms specified above. Also excluded are secondary amines which do not contain the requisite minimum of two active hydrogen atoms in the molecule. Since all primary amines will have at least two active hydrogen atoms, all primary amines are included within the scope of this invention. Examples of amines useful herein are primary and selected substituted aromatic and aliphatic amines, alkanol amines, polyalkylene polyamines, alkylene or arylene polyamines and heterocyclic amine compounds. Specific examples of suitable amines include methylamine, ethylamine, isopropylamine, n-butylamine, dodecylamine, methylethanolamine, diethanolamine, ethanolamine, aniline, N-hydroxymethyl aniline, N-hydroxyethylaniline, p-hydroxy-N-ethylaniline, p-aminoaniline, O-ethoxylated-N-methyl-p-aminophenol, piperazine, ethylenediamine, and the like. The foregoing amine neutralizing agents have been found to be capable of neutralizing the inorganic acid present in a polyester polymerization system containing an aliphatic or alicyclic polybasic acid without producing an undesirable color in the polyester polymerization product. Practical experience has indicated that a color change of more than four Gardner color units between the unpolymerized polyester reaction mixture and the polymerized polyester product is unsatisfactory. A change of four or less Gardner color units is acceptable for most end use applications of the polyester. Gardner color is measured according to the procedure described in ASTM D1544-68.

The neutralization is carried out by adding the amine to the polybasic acid intermediate containing the inorganic acid. One technique for neutralizing the acid before polymerization can be carried out by adding the amine to the acid intermediate before any other components of the polymerization system are added. The acid intermediate can be dissolved in a solvent such as dimethylformamide and the amine added to the resultant solution to facilitate the neutralization. Instead of a solvent, a suspending medium or emulsion medium can be used to provide a suspension or emulsion of the acid intermediate for neutralization. One liquid medium which can be conveniently used is the polyol intermediate for the polyester polymerization. If the acid intermediate is already mixed with the polyol, the neutralization can be carried out by adding the amine to the polybasic acid intermediate before appreciable polymerization between the acid intermediate and the polyol occurs. When the acid polyol mixture is heated to an elevated temperature of 125° to 150° C., the polybasic acid will be mostly soluble or dispersable in many of the polyols useful herein, such as ethylene and propylene glycol. The neutralizing agent can simply be added to the acid-polyol mixture and the mixture heated to initiate the acid-polyol polymerization reaction. As the acid dissolves or is dispersed in the polyol, complete neutralization of the inorganic acid present in the polybasic halogenated organic acid is achieved. The heating of the mixture can be continued, thereby causing polymerization of the acid and polyol to occur. After polymerization, the mixture can be cooled, crosslinking monomer and curing agent added, and the resultant mixture cured to produce the desired crosslinked polyester resin. The neutralizing agent can also be added directly to the solid acid intermediates, and the combined ingredients can be thoroughly mixed. In addition to neutralizing the inorganic acid in the acid intermediates in solution and by dry mixing, the neutralization can also be carried out by dispersing the acid intermediates in a solution containing the amine neutralizing agent and maintaining the dispersion for some period of time. The acid intermediates can be neutralized in the presence or absence of other polymerization reactants or additives such as the polyol, fillers, dyes, pigments, plasticizers, stabilizers and the like.

One particular neutralization technique has been to add the neutralizing agent to the polyester reactant system containing all of the polyester polymerization components, but not the catalyst, and thoroughly mix the neutralizing agent with the prepolymer system before polymerization occurs. In that embodiment, the halogenated aliphatic or alicyclic polybasic acid or anhydride is mixed with a halogenated aromatic polybasic acid or anhydride and with a polyol, thereby providing a mixture of the monomeric constituents for a polyester polymerization system. Optionally, the mixture can also contain one or more unhalogenated polybasic acids or anhydrides and the polyol can also consist of two or more distinct compounds, one or more of which can be halogenated. Prior to the onset of appreciable reaction between the acids or anhydrides and the polyol or polyols, the amine neutralizing agent is added to the mixture, and the mixture subsequently polymerized.

The duration of the neutralization step can vary depending upon the manner in which the acid intermediates and neutralizing agent are mixed, the temperature of the reactants, the stirring conditions, the type of neutralizing agent and the amount and type of residual acid impurities in the polyester acid intermediates. When the neutralizing agent is an alkanolamine and the acid intermediates are dissolved in a solvent or slurried in a polyol, a period of time of 10 to 20 minutes at or near room temperature has been found adequate to produce full neutralization of the inorganic acid residues. Temperatures and times outside the above conditions can also be used with equal, or nearly equal, effectiveness.

The amount of neutralizing agent required is dependent upon the amount of inorganic acid in the polybasic acid intermediate. If the inorganic acid is a residual acid present in small amounts, relatively little neutralizing agent may be required. Commercially available tetrabromophthalic anhydride customarily contains from about 0.1 to about 0.2% sulfuric acid. To neutralize the sulfuric acid in such an acid anhydride, approximately 0.5% by weight based on the anhydride present in the polymerization system of a neutralizing agent such as diethanolamine can be used. In general, from about 0.1% to about 5% or more of neutralizing agent, based on the polybasic acid or anhydride present in the polymerization system, has been found satisfactory for use in the practice of this invention. Larger and smaller amounts will also be required for different inorganic acids and different neutralizing agents.

The neutralization of inorganic acid should be approximately complete to attain best results with the subsequent polyester polymerization. Since trace amounts of inorganic acid, on the order of a few parts per million, such as five parts per million or less, may not appreciably affect the polyester polymerization, the neutralization need not be total but only substantially complete.

Polyesters which can be used in the improved process of this invention include both the saturated and the unsaturated polyesters. In general, a polyester is a polymer formed in a condensation polymerization between a polyol and a polybasic acid. Linear saturated polyesters used in fiber production employ both a saturated polyol such as ethylene glycol as well as a saturated polybasic acid such as terephthalic acid. Unsaturated polyesters can take a number of forms. One type of unsaturated polyester are the alkyd resins. Although the term "alkyd" has frequently been used to refer to polyfunctional polyesters modified with fatty acids or vegetable oils for use in paints and other coatings, the term also refers to unsaturated polyesters that can be processed by standard compression molding and transfer molding methods. Polyesters made from a glycol and an unsaturated dibasic acid can be mixed with any of a number of unsaturated cross-linking monomers such as diallyl phthalate, diacetone acrylamide, methyl methacrylate, styrene, vinyl toluene and the like. Often the unsaturated polyesters will be formed from a mixture of monomers containing more than one polyol or polybasic acid. One customary way in which unsaturation is introduced into the polymer is to conduct a polymerization using two or more polyols, one of which is unsaturated, or more commonly, two or more polybasic acids, one of which is unsaturated. Less frequently, both an unsaturated polyol and an unsaturated polybasic acid may be used in the synthesis of the polyester. Examples of polyols useful in polyester synthesis include ethylene glycol, propylene glycol, 1,4-butanediol glycerol, pentaerythritol, trimethylolpropane, triethylene glycol, diethylene glycol, bisphenol-A, polyether glycols such as polyethylene glycol, alicyclic polyols such as 1,4-dimethylolcyclohexene and heterocyclic polyols such as 3,3,5-tris(-hydroxymethyl)-5-methyl-4-hydroxytetrahydropyran. Polycarboxylic acids and anhydrides useful herein include phthalic acid, phthalic anhydride, isophthalic acid, trimellitic anhydride, terephthalic acid, tetrahydrophthalic anhydride, benzene-1,2,3,4-tetracarboxylic dianhydride, pyromellitic dianhydride, diphenyl-3,3',4,4'-tetracarboxylic dianhydride, adipic acid, succinic acid, benzoic acid, glutaric acid, maleic acid, maleic anhydride, fumaric acid, citraconic acid, itaconic acid and ethylene tetracarboxylic dianhydride. Flame-retardant reactive monomers having halogen atoms bound into the molecule which can be used in this invention include tetrabromophthalic anhydride, tetrachlorophthalic anhydride, dichloromaleic anhydride, dibromofumaric acid, 1,4,5,6,7,7-hexachlorobicyclo-[2,2,1]-5-heptene-2,3-dicarboxylic acid, 1,4,5,6,7,7-hexabromobicyclo-[2,2,1]-5-heptene-2,3-dicarboxylic acid, alkoxide adducts of tetrachloro-and tetrabromophthalic anhydride, halogenated prepolymers of cyclohexene dicarboxylic acids or anhydrides, a chlorinated aromatic diol such as the compound having the tradename Pearadiol, a chlorinated anhydride having the tradeanme Cloran, of the formula

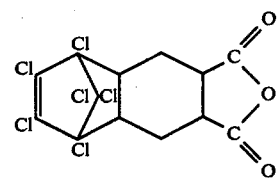

1,2-dichloroethylene glycol, 2,2-di(bromomethyl)propylene glycol, and 1,4-dimethylol-2,3,5,6-tetrabromocyclohexane. Dibromomaleic anhydride, dibromotetrahydrophthalic anhydride, dichlorotetrahydrophthalic anhydride, 2,3-dicarboxy-5,8-endomethylene-5,6,7,9,9-hexachloro-1,2,3,4,4a,5,8,8a-octahydronaphthalene anhydride, 2,3-dicarboxy-5,8-endomethylene-5,6,7,8,9,9-hexabromo-1,2,3,4,4a,5,8,8a-octahydronaphthalene anhydride, 2,3-dibromosuccinic acid, 2,3-dichlorosuccinic anhydride. When polybasic acids or polyols having more than a dual functionality are used herein, they are often used in minor amounts combined with a larger amount of some dibasic acid or diol. The reason for this usage is to reduce the amount of very high molecular weight crosslinked polyester which is formed when a trifunctional or higher-functional acid or polyol is employed.

Crosslinking agents can also be incorporated in the polymerization system to provide a crosslinked polymer. Vinyl monomers such as styrene, divinyltoluene, ethyl acrylate, methyl methacrylate, α-methyl styrene, diallyl phthalate, vinyl chloride, allyl bromide and the like, when placed in a system containing an unsaturated polybasic acid such as maleic acid, add across the double bonds of polymer molecules to produce a crosslinked, infusible polymer. The amount of crosslinking agent can vary substantially, but optimum properties for many end uses of the crosslinked polymers are obtained when 1.5 to 3 moles or more of crosslinking agent are used for each mole of the unsaturated acid.

Catalysts useful in polyester crosslinking are free radical catalysts, of which organic peroxides are the most common because of their low cost and easy handling. Other additives used in polyester polymerization systems include crosslinking inhibitors such as hydroquinone, stabilizers, viscosity modifiers, fillers and fibers, binders and coupling agents for fillers and fibers, and the like.

EXAMPLE 1

A quantity of 320 grams (0.69 mole) of tetrabromophthalic anhydride, 403.5 grams (1.04 mole) of 1,4,5,6,7,7-hexachlorobicyclo[2,2,1]-5-heptene-2,3-dicarboxylic acid (Het acid), 190 grams (1.28 mole) of phthalic anhydride, and 294.2 grams (3.0 moles) of maleic anhydride were mixed together with 383.6 grams (6.18 moles) of ethylene glycol. To the resultant mixture 1.35 grams of sodium acetate was added and the mixture heated to 115° C. with stirring during a twenty minute period under a nitrogen blanket. The solution, which was initially a clear, light yellow color, gradually became dark brown in color as the polymerization system was gradually heated to 185° C. and held at that temperature. During the six hour polymerization of the reaction mixture, water was continuously distilled from the system as it formed. At the end of the six-hour period, 108 ml. of water had been distilled. The mixture was allowed to cool and 0.23 gram of methyl hydroquinone was added to inhibit further polymerization. The color of the mixture was brown and had a Gardner color number of 9. The dark color of the resin rendered it unsuitable for many applications.

EXAMPLE 2

Example 1 was repeated except that the Het acid was not added to the mixture of polyester acid intermediates. Upon addition of the sodium acetate, the color of the solution was clear, pale yellow and remained a light yellow during the polymerization reaction. The Gardner color number was 2 to 3, indicating its suitability for all customary polyester applications.

EXAMPLE 3

A quantity of 296.2 grams (1.04 mole) of tetrachlorophthalic anhydride, 213.3 grams (0.46 mole) of tetrabromophthalic anhydride, 74.6 grams (0.51 mole) of phthalic anhydride, 196.1 grams (2.0 mole) of maleic anhydride, 255.7 grams (4.12 moles) of ethylene glycol, and 0.9 gram of sodium acetate were mixed together and heated for five hours at a temperature of 185° C. The reaction mixture was initially a clear, light yellow solution, and remained clear and light yellow at the end of the reaction period. The Gardner color number was 3 to 4. The solution was cooled and 0.15 gram of methyl hydroquinone was added as an inhibitor.

EXAMPLE 4

A quantity of 376.3 grams (0.96 mole) of Het acid, 152.8 grams (1.04 mole) of phthalic anhydride, 196.1 grams (2.0 mole) of maleic anhydride, 255.7 grams (4.12 moles) of ethylene glycol and 0.7 gram of sodium acetate were mixed together for 6.5 hours at 185° C. Upon initially mixing all of the above ingredients, the resultant solution was clear and light yellow in color. The color of the reaction solution changed from light yellow to orange to dark brown over a two hour period and remained dark brown in color when the polymerization reaction was complete. After the polymerization reaction mixture was cooled, 0.14 gram of methyl hydroquinone was added. The Gardner color number of the mixture was greater than 18.

EXAMPLE 5

A quantity of 53 grams (0.12 moles) of tetrabromophthalic anhydride, 67 grams (0.17 moles) of Het acid, 32 grams (0.21 moles) of phthalic anhydride, 49 grams (0.50 moles) of maleic anhydride, and 64 grams (1.0 moles) of ethylene glycol were mixed and reacted according to the procedure of Example 4. The reaction product was essentially colorless and had a Gardner color of 1 to 2, but the resin was unstable due to lack of neutralization of residual acid impurities.

Table 1 below is a tabulation of the results attained in Examples 1 to 5.

Table 1

| Ex. No. | NaAc | Acid Constituents* | Visual Color | Gardner Color |
| --- | --- | --- | --- | --- |
| 1 | Yes | TBPA, Het, PA, MA | Brown | 9 |
| 2 | Yes | TBPA, PA, MA | Light Yellow | 2 to 3 |
| 3 | Yes | TCPA, TBPA, PA, MA | Light Yellow | 3 to 4 |
| 4 | Yes | Het, PA, MA | Dark Brown | >18 |
| 5 | No | TBPA, Het, PA, MA | Light Yellow | 1 to 2 |

Table 1-continued

| Ex. No. | NaAc | Acid Constituents* | Visual Color | Gardner Color |
| --- | --- | --- | --- | --- |

*TCPA is tetrachlorophthalic anhydride
TBPA is tetrabromophthalic anhydride
Het is 1,4,5,6,7-hexachlorobicyclo[2,2,1]-5-heptene-2,3-dicarboxylic acid (Het acid)
PA is phthalic anhydride
MA is maleic anhydride

EXAMPLE 6

A quantity of 533.3 grams (1.2 moles) of tetrabromophthalic anhydride, 672.5 grams (1.7 moles) of Het acid, 317.0 grams (2.1 moles) of phthalic anhydride, 490.3 grams (5.0 moles) of maleic anhydride, 639.3 grams (10.3 moles) of ethylene glycol and 3.0 grams of diethanolamine were mixed together. The mixture was stirred and heated gradually to a temperature of 185° C. over a three hour period and held at that temperature with stirring and water removal for an additional 4.5 hours. The solution upon initial mixing was a clear, light yellow color and remained a light yellow when the polymerization reaction was complete. Gardner color number was 4. After the mixture cooled, 0.4 gram of methyl hydroquinone was added.

EXAMPLE 7

To 267 grams (0.58 moles) of tetrabromophthalic anhydride, 336 grams (0.87 moles) of Het Acid, 159 grams (1.1 moles) of phthalic anhydride, and 245 grams (2.5 moles) of maleic anhydride, were added 320 grams (5.2 moles) of ethylene glycol and 0.9 gram of n-butylamine. The mixture was heated to 185° C. over a one hour period and held at that temperature for an additional five hours. Upon initial mixing of the above reactants, the reaction solution was a clear light yellow color. Upon completion of the reaction, the Gardner color was 2 to 3, indicative of a light yellow color.

EXAMPLE 8

The procedure of Example 7 was followed except that 0.8 gram of ethanolamine was used in place of the n-butylamine. The color of the reaction product was a clear light yellow. Gardner color was 2 to 3.

EXAMPLE 9

The procedure of Example 7 was followed except that 1.3 gram of piperazine was used instead of the n-butylamine. The color of the reaction product was a clear light-to-medium yellow. The Gardner color was 3.

EXAMPLE 10

The procedure of Example 7 was followed except that 1.2 grams of aniline was used instead of the n-butylamine. The color of the reaction product was a clear light-to-medium yellow. The Gardner color was 3 to 4.

Table 2 is a tabulation of the results attained in Examples 6 to 10.

Table 2

| Ex. No. | Amine Neutralizing Agent | Visual Color | Gardner Color |
| --- | --- | --- | --- |
| 6 | Diethaolamine | Light Yellow | 3 to 4 |
| 7 | n-butylamine | Light Yellow | 2 to 3 |
| 8 | Ethanolamine | Light Yellow | 2 to 3 |
| 9 | Piperazine | Light Yellow | 3 |

Table 2-continued

| Ex. No. | Amine Neutralizing Agent | Visual Color | Gardner Color |
|---------|--------------------------|--------------|---------------|
| 10      | Aniline                  | Light Yellow | 3 to 4        |

EXAMPLE 11

Using the procedure of Example 7, six other amine neutralizing agents were used to determine their effect upon the color of the polyester reaction product. None of the six amines used in this Example is included within the scope of the instant invention. The visually observed colors and the Gardner colors are reported in Table 3.

Table 3

| Amine Neutralizing Agent | Visual Color | Gardner Color |
|--------------------------|--------------|---------------|
| triethylamine            | Dark Brown   | >18           |
| Diethylamine             | Red-Brown    | 12 to 13      |
| Triethanolamine          | Red-Brown    | 9 to 10       |
| Phenyldiethanolamine     | Dark Yellow  | 9 to 10       |
| Pyridine                 | Black        | >18           |
| Diethylaniline           | Red-Orange   | 12            |

EXAMPLE 12

The following is an example of a process within the scope of this invention which, if carried out, will illustrate another specific embodiment of the invention.

A quantity of 267 grams (0.58 moles) of tetrabromophthalic anhydride, 159 grams (1.1 moles) of phthalic anhydride, 245 grams (2.5 moles) of maleic anhydride and 219 grams (0.85 moles) of 2,3-dibromosuccinic anhydride is added to 320 grams (5.2 moles) ethylene glycol and 1.2 grams of ethylethanolamine. The mixture is heated and handled according to the procedure set forth in Example 7. The color of the reaction product is very light and comparable to the colors of the reaction products of Examples 6 to 10.

Example 1 shows that sodium acetate, a neutralizing agent frequently used in polyester polymerization mixtures containing inorganic acid impurities, produces an unsatisfactory brown color in polyester polymerization mixtures containing an aliphatic halogenated polybasic acid, Het acid. Example 2 shows that the unsatisfactory dark color of Example 1 is apparently due to the presence of the Het acid because, when the Het acid is removed as in Example 2, the color of the polyester reaction product is a very satisfactory light color. Example 3, using a chlorinated aromatic acid, tetrachlorophthalic anhydride instead of the alicyclic Het acid, confirms that the poor color in the reaction product of Example 1 is due to the presence of the alicyclic halogenated acid, Het acid. Another portion of the proof directed toward pin-pointing the cause of the dark color in the polyester reaction product is presented by Example 4, in which Het acid was the only halogenated acid in the polymerization mixture. The color of the product was very dark. The final portion of the proof establishing the cause of the dark color is set forth in Example 5 where no neutralizing agent of any kind is used in a polyester polymerization system containing Het acid and tetrabromophthalic anhydride. Since the color of the polymerization product of Example 5 is very light, a comparative study of the results of Examples 1 to 5 indicates that an unsatisfactory dark color in the polyester polymerization product is due to the reaction of the alicyclic Het acid with the sodium acetate neutralizing agent. Example 11 shows six different organic bases, including a number of amines which, upon addition to the polyester polymerization mixture, discolored the polyester polymerization product to an unsatisfactory degree. Examples 6 to 10, on the other hand, show several amine neutralizing agents which can be used to neutralize an inorganic acid in the presence of the Het acid. Example 12 shows that the amine neutralizing agents of this invention can also be satisfactorily used with other halogenated aliphatic or alicyclic halogenated polybasic acids or anhydrides.

What is claimed is:

1. A method for neutralizing inorganic acid impurities in situ in a polyester polymerization process comprising mixing a halogenated aliphatic or alicyclic polybasic acid or anhydride with other polymerization reactants, such as a polyol or polyols and halogenated or unhalogenated polybasic acids or anhydrides, adding an alkanolamine neutralizing agent to the above mixture, and heating said mixture to an elevated temperature, whereby a polyester of improved color is obtained.

2. A process according to claim 1 wherein said alkanolamine is diethanolamine.

3. A method for neutralizing inorganic acid impurities in situ in a polyester polymerization process comprising mixing a halogenated aliphatic or alicyclic polybasic acid or anhydride with other polymerization reactants, such as a polyol or polyols and halogenated or unhalogenated polybasic acids or anhydrides, adding a n-butylamine neutralizing agent to the above mixture, and heating said mixture to an elevated temperature, whereby a polyester of improved color is obtained.

4. A method for neutralizing inorganic acid impurities in situ in a polyester polymerization process comprising mixing a halogenated aliphatic or alicyclic polybasic acid or anhydride with other polymerization reactants, such as a polyol or polyols and halogenated of unhalogenated polybasic acids or anhydrides, adding an aniline neutralizing agent to the above mixture, and heating said mixture to an elevated temperature, whereby a polyester of improved color is obtained.

5. A method for neutralizing inorganic acid impurities in situ in a polyester polymerization process comprising mixing a halogenated aliphatic or alicyclic polybasic acid or anhydride with other polymerization reactants, such as a polyol or polyols and halogenated or unhalogenated polybasic acids or anhydrides, adding a piperazine neutralizing agent to the above mixture, and heating said mixture to an elevated temperature, whereby a polyester of improved color is obtained.

6. A method for neutralizing inorganic acid impurities in situ in a polyester polymerization process comprising mixing tetrabromophthalic anhydride with 1,4,5,6,7,7-hexachlorobicyclo-(2,2,1)-5-heptene-2,3-dicarboxylic acid and a polyol, adding an alkanolamine neutralizing agent to the above mixture, and heating said mixture to an elevated temperature, whereby a polyester of improved color is obtained.

7. A process according to claim 6 wherein said alkanolamine is diethanolamine.

8. A method for neutralizing inorganic acid impurities in situ in a polyester polymerization process comprising mixing tetrabromophthalic anhydride with 1,4,5,6,7,7-hexachlorobicyclo-(2,2,1)-5-heptene-2,3-dicarboxylic acid and a polyol, adding a n-butylamine neutralizing agent to the above mixture, and heating said mixture to an elevated temperature, whereby a polyester of improved color is obtained.

9. A method for neutralizing inorganic acid impurities in situ in a polyester polymerization process comprising mixing tetrabromophthalic anhydride with 1,4,5,6,7,7-hexachlorobicyclo-(2,2,1)-5-heptene-2,3-dicarboxylic acid and a polyol, adding an aniline neutralizing agent to the above mixture, and heating said mixture to an elevated temperature, whereby a polyester of improved color is obtained.

10. A method for neutralizing inorganic acid impurities in situ in a polyester polymerization process comprising mixing tetrabromophthalic anhydride with 1,4,5,6,7,7-hexachlorobicyclo-(2,2,1)-5-heptene-2,3-dicarboxylic acid and a polyol, adding a piperazine neutralizing agent to the above mixture, and heating said mixture to an elevated temperature, whereby a polyester of improved color is obtained.